Dec. 23, 1952  G. W. BAUGHMAN  2,623,107
GROUND DETECTING APPARATUS
Filed Oct. 4, 1949
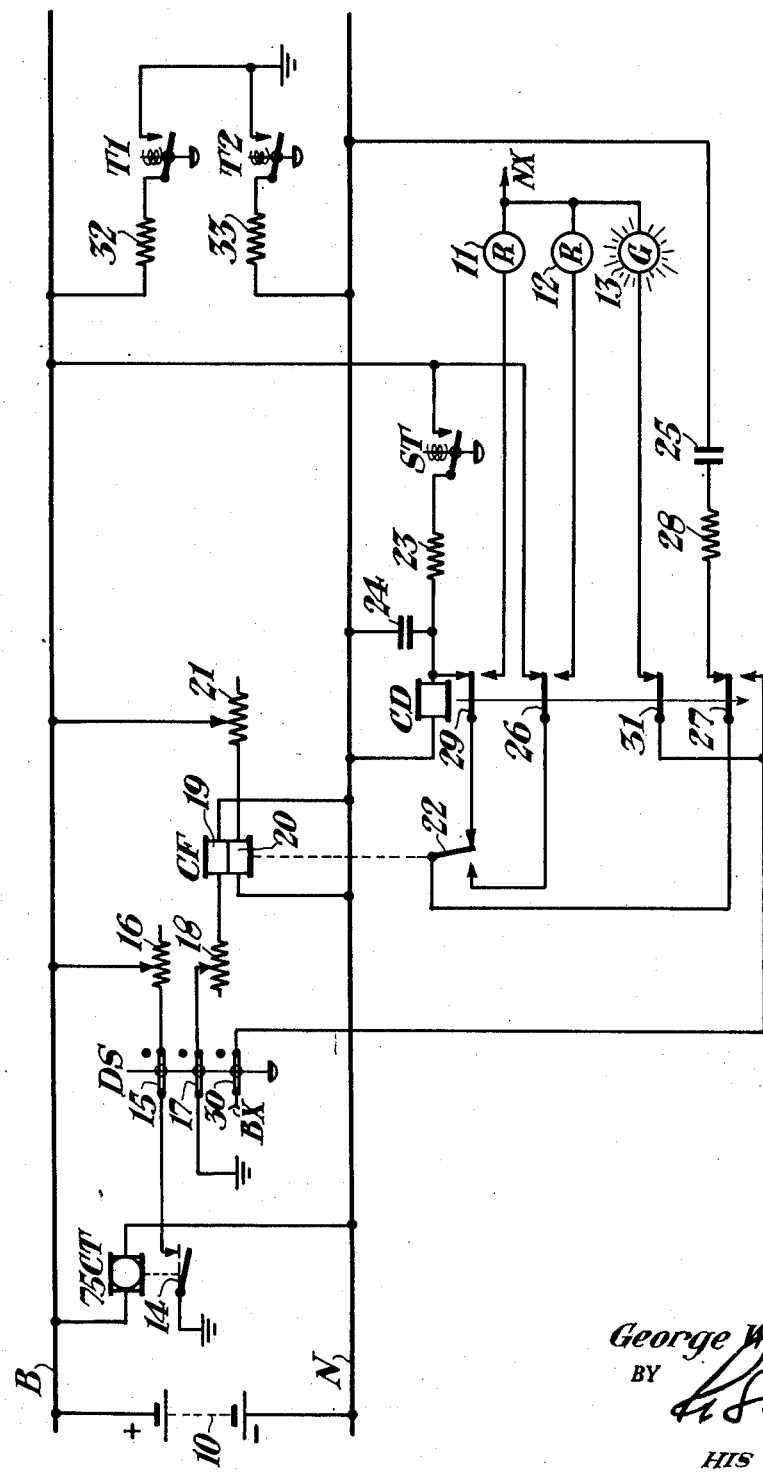
INVENTOR.
George W. Baughman.
BY
HIS ATTORNEY Patented Dec. 23, 1952

2,623,107

UNITED STATES PATENT OFFICE 2,623,107

GROUND DETECTING APPARATUS

George W. Baughman, Swissvale, Pa., assignor to Westinghouse Air Brake Company, a corporation of Pennsylvania Application October 4, 1949, Serial No. 119,399

10 Claims. (Cl. 177—311)

The present invention relates to ground detectors, and more particularly to apparatus for detection of grounded conditions in a direct current line circuit.

In signaling systems using direct current, grounded conditions may exist in the line circuits, particularly where such circuits are carried in underground cables. Should grounds occur in any control circuits for relays, the relays may pick up or release depending upon their connections and function to initiate circuit operations for which such relays were provided. Particularly when such relays control the operation of safety devices such as railway signals or track switches in a railway signaling system, it is desirable that a grounded condition be removed as soon after occurrence as possible. While apparatus has been provided in the past for the detection of grounded line conditions, independent indications of normal operating conditions, and indications of grounded conditions of the individual line wires were not provided.

An object of my present invention is to provide apparatus for the detection of ground conditions in line circuits comprising a pair of line wires whereby indications will be given as to the normal operation of the system and as to the grounded condition of each line wire of the pair.

A feature of my invention is the provision of an additional distinctive indication of a temporary ground which persists after the ground is removed, until the ground detector apparatus is manually reset.

A further object of my invention is to provide apparatus for the detection of grounded conditions in the direct current supply circuits of a signaling system which operates on the closed circuit principle and which apparatus in operation does not interfere with the normal functioning of the signaling system.

Other objects of the invention will in part be obvious and in part hereinafter pointed out.

I shall describe one form of a ground detector embodying my invention and shall then point out the novel features thereof in the appended claims.

In the accompanying drawing, forming a part of this specification, a ground detector system is shown comprising one of the various possible illustrative embodiments of this invention, arranged to detect the grounding of either of two line or bus wires B and N connected to the terminals of a direct current source 10 and forming a supply circuit for a signaling system. As shown, the ground detector system is arranged to indicate the occurrence of a connection of either line B or N to ground due to a fault which has a resistance less than a predetermined value, and to also indicate which wire is grounded due to such fault. When wire B is grounded, due to a fault, a red lamp 11 is lighted, and when wire N is grounded, due to a fault, lamp 12 is lighted. Normally a green lamp 13 is lighted, which indicates that the ground detector system is in operation and that the line wires B and N are substantially free from grounds.

For the detection of grounds this ground detector system employs coded current of the type well known in the railway signaling art, supplied by a continuously operating code transmitter 75CT of a conventional type. The winding of the code transmitter 75CT is supplied with energy over connections to wires B and N leading to the terminals of the source 10, and its contact 14 operates continuously at a fixed rate such as 75 times per minute to periodically establish a high resistance connection from ground through the normally closed contact 15 of a disconnect switch DS and an adjustable resistor 16 to one of the line wires, wire B as shown. This connection is included in the circuit for the main or control winding 19 of a sensitive code following polar relay CF, which circuit extends from a second connection to ground over contact 17 of switch DS through an adjustable resistor 18 and winding 19 to the other line wire N. The values of the resistors 16 and 18 are sufficiently high so that in the event of a fault, currents of only negligible value are supplied to the signaling apparatus through the ground detector, and in the absence of a fault the line wires B and N are for all practical purposes essentially ungrounded.

The polar relay CF is electrically biased by the provision of a second winding 20 which is constantly supplied with energy from wires B and N, in series with an adjustable resistor 21.

The windings of relay CF and the values of the resistors in their circuits are so proportioned that when the circuit for winding 19 is open, the energization of winding 20 causes the relay contact 22 to assume its right-hand position, as shown, but when both windings are energized, contact 22 assumes its left-hand position. The armature of relay CF is biased magnetically only to an extent sufficient to prevent its vibration when both windings are deenergized.

A code following relay CF which is biased magnetically to its right-hand position with a force corresponding to that provided by the energization of winding 20 may also be used, in which case winding 20 is not needed, but the electrically biased relay is preferred because it may be more readily adjusted to any desired degree of sensitivity, and for the further reason that it provides voltage compensation, since the operating and biasing forces both vary in the same sense with variations in the supply voltage.

From the circuit elements and connections thus far described, it will be apparent that the code transmitter 75CT periodically establishes a high resistance connection from the positive side of the battery to ground. The code following relay CF having its main coil 19 connected across the negative wire N and ground, will follow the code and operate its contact 22 to the left each time contact 14 closes, and to the right each time contact 14 opens. The apparatus operates on the closed circuit principle, so that any opening of the circuit will stop the code operation of relay CF with its contact in either its right-hand or left-hand position, and lamp 11 or 12 will be energized in the manner to be described to indicate the inoperative condition of the circuit.

The ground detector is further provided with a code detector relay CD having its winding connected at one end to the negative wire N and connected at the other end through a resistor 23 and a reset button ST to the positive wire B. Relay CD is made slow to release by the provision of a snubbing condenser 24 connected in parallel with its winding.

Relay CD is picked up by pressing button ST at a time when relay CF is being operated periodically, and is then maintained picked up by energy stored in a condenser 25 and supplied periodically to relay CD by relay CF. Assuming that relay CD is picked up, it will be seen that each time relay CF is operated to the left, condenser 25 is charged over the circuit extending from the positive wire B over front contact 26 of relay CD, the left-hand contact 22 of relay CF and front contact 27 of relay CD through resistor 28 and condenser 25 to wire N. Each time relay CF is operated to the right, the energy stored in condenser 25 discharges in part over the circuit including front contact 27, right-hand contact 22, front contact 29 and winding of relay CD. A portion of this energy is stored in condenser 24, which discharges through the winding of relay CD and serves to maintain it picked up during the intervals when contact 22 is in its left-hand position.

When relay CD is picked up, the green lamp 13 is energized over a circuit extending from one terminal BX of a suitable source of energy, usually the local alternating current lighting circuit, over the disconnect switch contact 30, front contact 31 of relay CD, lamp 13 to the other terminal NX of the same source.

When relay CD is released, the red lamp 11 or 12 is energized over the circuit from terminal BX, contact 30, back contact 27 of relay CD, contact 22 of relay CF, back contact 29 or 26 of relay CD and lamp 11 or 12 to terminal NX.

In addition to the foregoing, the ground detector system includes two fixed calibrating resistors 32 and 33 through which the wires B and N may be grounded by the operation of the manually operable keys T1 and T2 for purposes of test or adjustment, as hereinafter described.

Operation

When the ground detector is connected to the source 10 over line wires B and N, the code transmitter 75CT operates continuously and its contact 14 periodically applies a high resistance ground to line wire B. In the absence of ground on either line wire due to a fault, the code following relay CF having its winding 19 connected between ground and the negative line N repeats the code operation of contact 14, and if relay CD is released, the periodic operation of contact 22 causes the red lamps 11 and 12 to flash alternately at the code rate. Relay CD is picked up by momentarily pressing the button ST, and is maintained picked up, as long as the periodic operation of contact 22 continues, by energy stored in condenser 25 each time contact 22 assumes its left-hand position and delivered to relay CD each time contact 22 assumes its right-hand position.

When relay CD is picked up, lamps 11 and 12 are dark and the green lamp 13 is steadily lighted, indicating that the ground detector is in operation and that the line wires to which it is connected are substantially free from grounds.

If the positive line wire B becomes grounded for any reason, contact 14 will be shunted by the ground connection and energy from wire B will be supplied continuously to winding 19, causing relay CF to hold its contact 22 in the left-hand position, and relay CD will release as soon as the energy stored in condenser 24 discharges through its winding, and will open its holding circuit at contact 29. Lamp 13 will become dark and lamp 12 will be steadily lighted to provide a visual indication of the grounded condition of the positive line wire B.

If the negative line wire N becomes grounded for any reason, instead of wire B, when the ground detector system is in operation as above described, the winding of the code following relay CF will be shunted by the connection from wire N to ground, enabling the winding 20 to hold contact 22 in its right-hand position, and relay CD will release as soon as the energy stored in condensers 25 and 24 discharges through its winding, opening its holding circuit at contact 29. Lamp 13 will become dark and lamp 11 will be steadily lighted to provide a visual indication of the grounded condition of the negative line wire N.

The disconnect switch DS is provided to permit the opening of the coding circuit, the code following relay circuit and the signal lamp circuits so that these circuits will not interfere with the work of locating the grounds detected by the system. Should the grounded condition of either line wire B or N be cleared while the disconnect switch contacts are closed, relay CF will resume its code operation, alternately completing the circuits for lamps 11 and 12. The two red lamps will thus flash alternately until the reset button ST is pressed to reenergize the code detector relay CD.

To calibrate the ground detector, it is connected to the terminal wires such as B and N of a supply circuit known to be free from grounds and the keys T1 and T2 are closed, one at a time.

When key T1 is closed, winding 19 of relay CF is supplied with energy over a circuit from wire B, resistor 32, key T1, to ground in parallel with the intermittently closed circuit including resistor 16 and contact 14. Resistors 18 and 21 are adjusted so that relay CF just fails to open its left-hand contact in response to the opening of contact 14. The value of resistor 32 then represents the maximum resistance of a connection of wire B to ground, due to a fault, which the system is capable of detecting.

Key T1 is then opened and key T2 closed, so that a portion of the energy supplied from wire B over contact 14 is shunted from winding 19 through resistor 33 to wire N. Resistor 16 is adjusted so that relay CF just fails to open its right-hand contact in response to the closing of contact 14. The value of resistor 33 then represents the maximum resistance of a connection of wire N to ground, due to a fault, which the system is capable of detecting.

In practice, the calibrating resistors may have a value of 5000 ohms, for example, well above the maximum resistance of any ground due to a fault which would have an adverse effect on the signaling apparatus connected to line wires B and N, and the ground detector system will then detect the occurrence of any ground the resistance of which is less than its calibrated value. If the ground is permanent, lamp 11 will be steadily lighted if it is on wire B, and lamp 12 will be lighted if it is on wire N. If the ground is temporary and of a duration of one-half second or more, for example, sufficient to effect the release of relay CD, lamps 11 and 12 will flash alternately at the code rate, following the removal of the temporary ground, until the system is reset by pressing button ST.

Although I have herein shown and described only one form of ground detecting apparatus embodying my invention, it will be understood that various changes and modifications may be made therein within the scope of the appended claims without departing from the spirit and scope of my invention.

Having thus described my invention what I claim is:

1. A ground detector for a pair of line wires comprising a relay having an operating winding, means alternately energizing and deenergizing said winding over a circuit including connections to ground and supplied with energy from said line wires, said circuit being so arranged that said relay remains in its energized position when one of said line wires is grounded due to a fault and remains in its deenergized position when the other of said line wires is grounded due to a fault, and indication means controlled by said relay to indicate which of said line wires is grounded due to such fault.

2. A ground detector for a pair of line wires comprising a polar relay having a biasing winding and a main winding, said biasing winding being connected across the line wires, means for periodically energizing and deenergizing the main winding of said relay, said main winding remaining energized when one of said line wires is grounded due to a fault and remaining deenergized when the other of said line wires is grounded due to a fault, a detector relay controlled by said polar relay and indication means controlled by said polar and detector relays to indicate which of said line wires is grounded due to such fault.

3. A ground detector for a pair of line wires comprising a polar relay having a biasing winding and a main winding, said biasing winding being connected across said line wires, said main winding being connected across one of said line wires and ground, means periodically connecting the other line wire to ground to periodically energize the main winding of said relay, said winding remaining energized when said other line wire is grounded due to a fault and remaining deenergized when said one line wire is grounded due to a fault, a detector relay controlled by said polar relay and indication means controlled by said polar and detector relays to indicate which of said line wires is grounded due to such fault.

4. A ground detector for a direct current supply circuit including two line wires, comprising a code transmitter for generating code impulses of energy derived from said line circuit, a code following relay, a grounded circuit for supplying the impulses to said relay, so arranged that the relay remains energized when one of said line wires is grounded due to a fault and remains deenergized when the other of said line wires is grounded due to a fault, a code detector controlled by said code following relay, and indication means controlled by said code detector to indicate the ungrounded condition of said line wires when said code following relay is responding to said code impulses and to indicate which of said line wires is grounded due to a fault when the operation of the code following relay ceases due to said fault.

5. A ground detector for a direct current supply circuit including two line wires, comprising a code transmitter for periodically connecting one of said line wires to ground through a first resistor, a code following relay connected to the other of said line wires and ground through a second resistor, a contact on said relay adapted to follow the code of said transmitter, said contact remaining in one position when one of said line wires is grounded due to a fault having a resistance less than a predetermined value and remaining in another position when the other of said line wires is grounded due to a fault having a resistance less than a predetermined value, a code detector relay controlled by said code following relay, indication means controlled by said code detector relay to indicate the ungrounded condition of said line wires, and means for adjusting said resistors for determining the maximum value of fault resistance to be indicated by said code detector relay.

6. A ground detector for a direct current supply circuit including two line wires, comprising a code transmitter having a contact which closes periodically and a code following relay, an energizing circuit for said relay extending from one of said line wires over said contact to ground and from the other of said line wires through a winding of said relay to ground, whereby a ground due to a fault on said one line wire shunts said contact and a ground due to a fault on the other line wire shunts said winding, a code detector relay operated by said code following relay and indication means responsive to the operation of said code detector relay to indicate the ungrounded condition of said line wires.

7. A ground detector for a direct current supply circuit including two line wires comprising a code transmitter relay having a contact which closes periodically and a code following relay, a circuit for said relay extending from one of said line wires over said contact to ground and from the other of said line wires through the winding of said relay to ground, whereby a ground due to a fault on said one line wire shunts said contact and a ground due to a fault on the other line wire shunts said relay, said relay being supplied periodically with energy from said supply circuit only when both line wires are substantially free from grounds, a code detector relay having a pickup circuit and a stick circuit, manually operable means for closing said pickup circuit to initially energize the code detector relay, decoding means for supplying impulses of energy to said stick circuit in response to the periodic operation of said code following relay to maintain said code detector relay energized, and indication means controlled by said code detector relay.

8. A ground detector for a pair of line wires comprising a relay biased to a first position, a circuit for supplying impulses of energy from said line wires to operate said relay periodically to a second position, said circuit having a first portion including a periodically operating contact and extending from one of the line wires to ground and a second portion extending from ground through said relay to the other line wire, so proportioned that said relay is maintained in its second position when the resistance of said one line wire to ground due to a fault is less than a predetermined value and said relay is maintained in its first position when the resistance of the other line wire to ground due to a fault is less than a predetermined value, a detector relay operated by said first relay and indication means selectively responsive to the periodic operation of said first relay and operation of said detector relay for indicating such fault.

9. A ground detector for a pair of line wires comprising a sensitive relay, means for periodically operating said relay between normal and reverse positions when said line wires are substantially free from grounds, means for causing said relay to remain in its normal position when one of said line wires is grounded due to a fault and to remain in its reverse position when the other line wire is grounded due to a fault, a stick relay having pickup and stick circuits, said pickup circuit including a normally open manually operable contact, means for supplying impulses of energy to said stick circuit to maintain the stick relay picked up in response to the periodic operation of said sensitive relay, a first indication lamp controlled over a front contact of said stick relay for indicating the absence of grounds on said line wires, and two other indication lamps controlled over back contacts of said stick relay and over normal and reverse contacts respectively of said sensitive relay for indicating the presence of a ground due to a fault.

10. A ground detector for a pair of line wires comprising a code following relay, means including a code transmitter for periodically operating said relay between two positions effective only when said line wires are substantially free from grounds, a code detector relay selectively responsive to the periodic operation of said code following relay, a first indication lamp controlled over a front contact of said code detector relay for indicating an absence of grounds on said line wires, and two other indication lamps each controlled over a back contact of said code detector relay and over a normal and a reverse contact respectively of said code following relay for indicating the presence of a ground on the line wires due to a fault, said two indicating lamps being controlled over their respective back contacts of said code detecting relay and over the normal and reverse contacts of said code following relay to indicate the removal of a temporary ground from said line wires.

GEORGE W. BAUGHMAN.

REFERENCES CITED

The following references are of record in the file of this patent:

UNITED STATES PATENTS

| Number | Name | Date |
|---|---|---|
| 2,010,840 | Baughman | Aug. 13, 1935 |

FOREIGN PATENTS

| Number | Country | Date |
|---|---|---|
| 289,538 | Great Britain | Apr. 30, 1928 |

OTHER REFERENCES

Railway Signaling, "Ground Detector Relays," page 639, Oct. 1947.